(12) United States Patent
Whikehart

(10) Patent No.: US 8,661,475 B2
(45) Date of Patent: Feb. 25, 2014

(54) SYSTEM AND METHOD FOR AFFINITY MARKETING TO MOBILE DEVICES

(71) Applicant: J. William Whikehart, Milford, MI (US)

(72) Inventor: J. William Whikehart, Milford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 13/924,769

(22) Filed: Jun. 24, 2013

(65) Prior Publication Data

US 2013/0291028 A1      Oct. 31, 2013

Related U.S. Application Data

(63) Continuation of application No. 11/969,585, filed on Jan. 4, 2008, now abandoned.

(51) Int. Cl.
*H04N 7/16*      (2011.01)

(52) U.S. Cl.
USPC ............. 725/62; 725/38; 725/75; 725/139; 725/151; 725/138; 725/146; 725/32

(58) Field of Classification Search
None
See application file for complete search history.

(56) References Cited

U.S. PATENT DOCUMENTS

| | | | |
|---|---|---|---|
| 5,515,372 A * | 5/1996 | Porter | 370/312 |
| 7,126,581 B2 * | 10/2006 | Burk et al. | 345/156 |
| 2002/0092025 A1 * | 7/2002 | Klumpp | 725/62 |
| 2003/0125033 A1 * | 7/2003 | Rindsberg et al. | 455/450 |
| 2004/0078814 A1 * | 4/2004 | Allen | 725/47 |
| 2004/0139480 A1 * | 7/2004 | Delpuch et al. | 725/135 |
| 2004/0158429 A1 * | 8/2004 | Bary et al. | 702/183 |
| 2004/0216054 A1 * | 10/2004 | Mathews et al. | 715/765 |
| 2005/0044565 A1 * | 2/2005 | Jerding et al. | 725/37 |
| 2005/0183126 A1 * | 8/2005 | Murao et al. | 725/75 |
| 2005/0262063 A1 * | 11/2005 | Conboy et al. | 707/3 |
| 2005/0266814 A1 * | 12/2005 | Steelberg et al. | 455/186.1 |
| 2005/0289591 A1 * | 12/2005 | Vermola et al. | 725/45 |
| 2006/0020609 A1 * | 1/2006 | LaChapelle et al. | 707/100 |
| 2006/0174273 A1 * | 8/2006 | Park et al. | 725/41 |
| 2006/0253794 A1 * | 11/2006 | Wilson | 715/779 |
| 2006/0259613 A1 * | 11/2006 | Othmer | 709/224 |
| 2006/0265727 A1 * | 11/2006 | Vermola | 725/56 |
| 2007/0126643 A1 * | 6/2007 | Park et al. | 343/702 |
| 2007/0220550 A1 * | 9/2007 | Ljungman et al. | 725/42 |
| 2008/0270890 A1 * | 10/2008 | Stern | 715/239 |
| 2011/0246517 A1 * | 10/2011 | Nathan et al. | 707/769 |

* cited by examiner

*Primary Examiner* — Jason J Chung
(74) *Attorney, Agent, or Firm* — Dickinson Wright PLLC

(57) ABSTRACT

A method and system for providing selected content displays to users of mobile electronic devices and more specifically to a method and system for broadcasters to provide a marketing portal presented in the form of displayed customized broadcaster content.

3 Claims, 4 Drawing Sheets

SYSTEM AND METHOD FOR AFFINITY MARKETING TO MOBILE DEVICES

CROSS REFERENCE TO RELATED APPLICATIONS

This U.S. Continuation patent application claims the benefit of U.S. patent application Ser. No. 11/969,585 filed Jan. 4, 2008, entitled "System And Method For Affinity Marketing To Mobile Devices," the entire disclosure of the application being considered part of the disclosure of this application, and hereby incorporated by reference.

STATEMENT REGARDING FEDERALLY SPONSORED RESEARCH OR DEVELOPMENT

None.

BACKGROUND OF THE INVENTION

1. Technical Field

This present invention is directed to a method and system for providing selected content displays to users of mobile electronic devices and more specifically to a method and system for broadcasters to provide a marketing portal presented in the form of displayed customized broadcaster content.

2. Discussion

To improve customer loyalty, retailers have long used affinity based marketing programs. As the delivery of information becomes more important to consumers, many companies focus on providing or locating content for users through the internet. The companies who create content for users are generally known as content producers and the companies who deliver or find content from content producers are generally known as content providers. As users have become more mobile and new technology has been developed, users have a greater selection of mediums through which to receive their content. As users are becoming more mobile, the importance of quickly and reliably reaching these users has increased.

To improve customer loyalty many content providers use affinity based marketing through the internet. Internet based affinity marketing typically uses customizable tools and specialized content. While internet based affinity marketing is widely used, many mobile consumer devices are not readily connected to the internet and have not yet developed a system or method to provide specialized content or other affinity marketing tools directly to the user. For example, radio broadcasters have long been able to provide simple information to radio displays, including song title, artist, genre, station identifications and even in some limited contexts simplified versions of album artwork. Some radio displays include device specific displays, but generally broadcasters have not been able to provide specific content that includes visually displayed advertising, specialized content, and other affinity based marketing information and content. Furthermore, broadcasters of non-internet provided information have not been able to individually provide a displayed look and feel to users, such as through broadcaster specific skins. Therefore, while broadcasters have long been able to visually and interactively provide specialty content and affinity marketing to computers via their websites and specialized content players, traditional broadcasters have not been able to provide specialized content or other affinity marketing services to users of radios, phones with radios, and televisions free from the internet as internal access for many mobile devices is very limited. Furthermore, broadcasters have not been able to provide specialized content and affinity based marketing services directly to vehicles.

Therefore, it is desirable to provide a system and method for interactively communicating with mobile systems, and in particular with vehicle radios used by various consumers to provide affinity based marketing services.

SUMMARY OF THE INVENTION

In view of the above, the present invention is directed to a method and system for providing selected content displays to users of mobile electronic devices and more specifically to a method and system for providing a marketing portal for customized broadcaster content and affinity marketing content.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

The present invention is directed to a method and system for providing selected content displays to users of mobile electronic devices and more specifically to a method and system for providing a marketing portal for customized broadcaster content and affinity marketing content.

The system typically includes a broadcast station or signal source 100 capable of providing content to mobile devices. The broadcast station may be any desirable broadcast system but is preferably capable of broadcasting through at least AM, FM radio bands, satellite radio, or various TV signals. More preferably, the broadcast station is capable of broadcasting IBOC or In-Band-On-Channel radio, also known as HD Radio to mobile devices such as vehicle radios and mobile phones capable of receiving radio signals. The primary purpose of this invention is to provide specialized broadcaster content or other affinity based marketing content through traditional broadcast mechanisms and not through the internet. Throughout this application, the term "traditional broadcasters" or "traditional broadcasts" will be used and will refer to broadcasts through AM, FM radio bands, various TV signals, satellite radio broadcasts, and similar signals broadcast from a tower to a mobile end user and excludes content provided through the internet to the user. More specifically, the broadcaster must be capable of providing specialized content to many users, without individual interaction with the end user upstream to the broadcaster. Traditional broadcast systems in this application will broadcast the information directly to the end user or multiple end users without the necessity for direct interaction. In comparison, when a user obtains content through the internet, the user's actions send a signal back to content provider and therefore require some uplink connection from the user to the broadcaster which the present invention does not need.

Until recently, traditional broadcasters were limited to provide data to remote devices such as vehicle radios to using RDS, also known as Radio Data System. RDS only allowed for very basic text information as RDS does not have the bandwidth capacity for significant graphic content, such as providing album covers, backgrounds, or detailed skins. In comparison, the present invention by using IBOC allows for detailed graphical displays by the broadcaster and has a greater data capacity for many graphical applications. Information provided through RDS typically only included station call signs, song titles, artist names, album names and other limited textual displays. Any graphical display rules were generally chosen by the end user's device.

Figure 1:
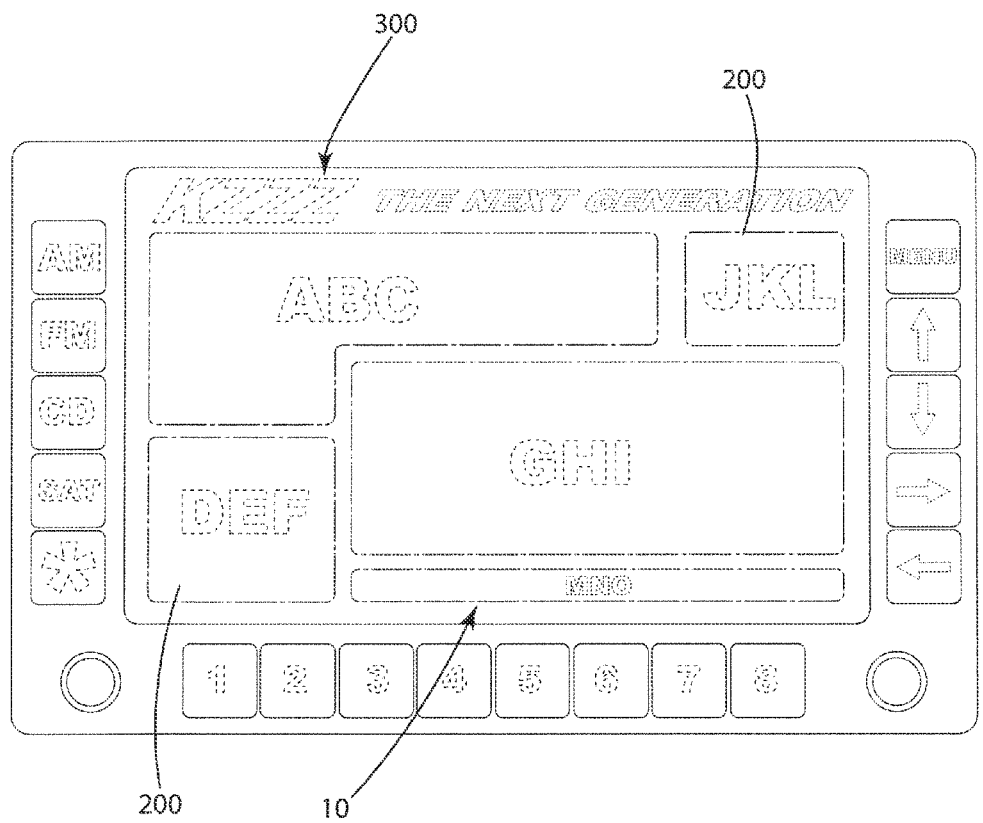
FIG. 1 is a schematic view of an exemplary radio.
Figure 2:
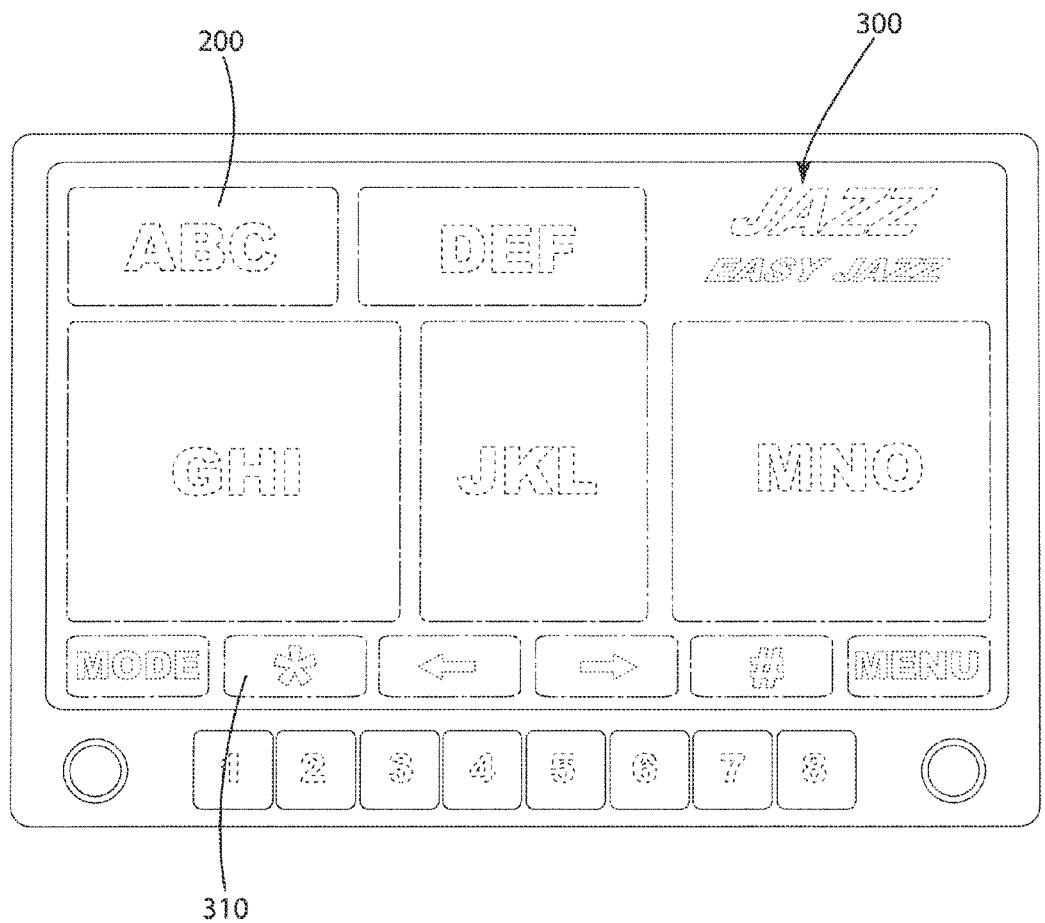
FIG. 2 is a schematic view of a second exemplary radio display including a touch screen with soft keys.
Figure 3:
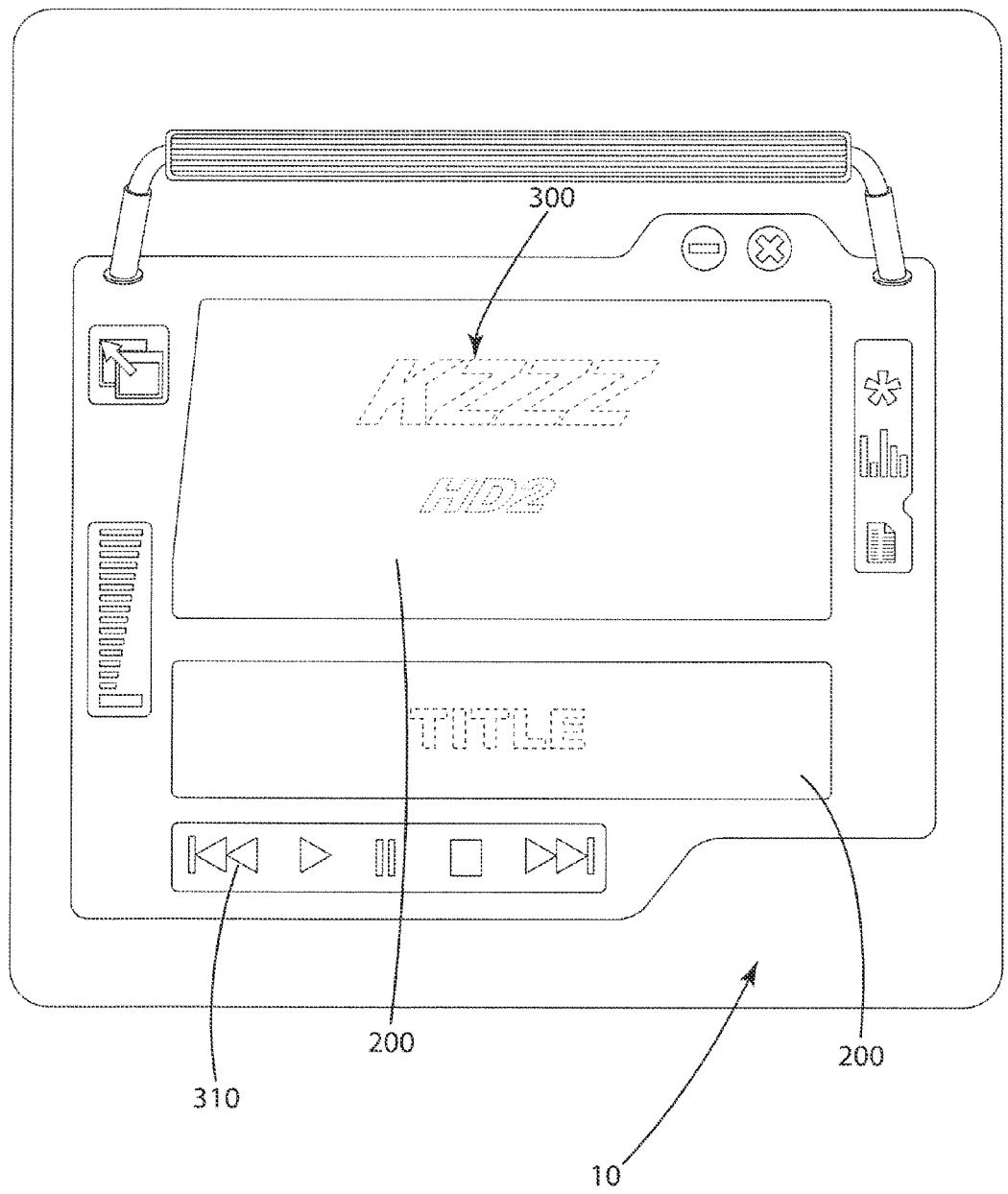
FIG. 3 is a schematic view of a third exemplary radio display with a broadcaster provided skin.

A mobile device receives the signals from the broadcaster. The display 10 of the mobile device is schematically illustrated in FIGS. 1-3 as a vehicle radio, and in particular the display screen of a vehicle radio. One skilled in the art would recognize the present invention may be used with any mobile device capable of receiving the broadcaster's signal and a device that does not require communication from the mobile device to the broadcaster. One skilled in the art would also recognize that the mobile device may include multiple functions, for example receive and send communication as a mobile phone, but also include a receiver of traditional broadcasts that does not require sending of information back to the broadcaster or sender of information. The mobile device includes a controller 140 which provides an output to the display screen. The output to the display screen may be a video signal or the controller providing graphic information to a screen through known method. In this application, the term video signal or video output refers broadly to any method of a controller providing graphical content to a display.

If the mobile device is a vehicle radio, it can be used with any radio capable of visually displaying the broadcaster's content. The radio may include buttons arranged in any configuration about the display, as illustrated in FIG. 1, or in addition to buttons arranged about the display, the display may be a touch screen incorporating soft buttons 310 that may change functions depending on the current content display. Although not illustrated, the present invention may be incorporated into mobile phones that receive traditional broadcasts, portable TVs and other devices capable of receiving traditional broadcasts. For example, if a laptop computer is equipped to receive FM radio signals, the computer could be configured to receive specialized content from the broadcaster, without sending any information to the broadcaster. As described above, if a computer uses the internet to receive data, it must send some information to the provider of the data to ensure proper communication, unlike the present invention. As radio and TV waves are extremely prevalent throughout the world, it is advantageous to provide a system for transferring specialized content, including affinity based content to an end user when the internet is not available but traditional broadcasts are available.

Although the broadcaster content may be provided through traditional radios, additional features may be available to the end user of dual tuner mobile devices capable of receiving at least two broadcasts simultaneously. For example, on a dual tuner radio, the user may listen and receive live content from one broadcaster, while additional content, such as a skin for the display, downloads from another broadcaster. Once a skin is downloaded the user may be able to use the skin of their choice, even though they may be listening to a different broadcaster than the broadcaster that provided the skin. Of course, a broadcaster may provide rules as part of the content download process that prevent such cross use of skins, such as preventing the use of their skin with other broadcaster's programs and content.

The mobile device may also capable of allowing the user to customize the display. Therefore, if the end user does not like the broadcaster provided content, such as a "skin" the broadcaster uses to display their station, the end user can use a standard skin preprogrammed in the radio, or other customized skins.

Figure 4:
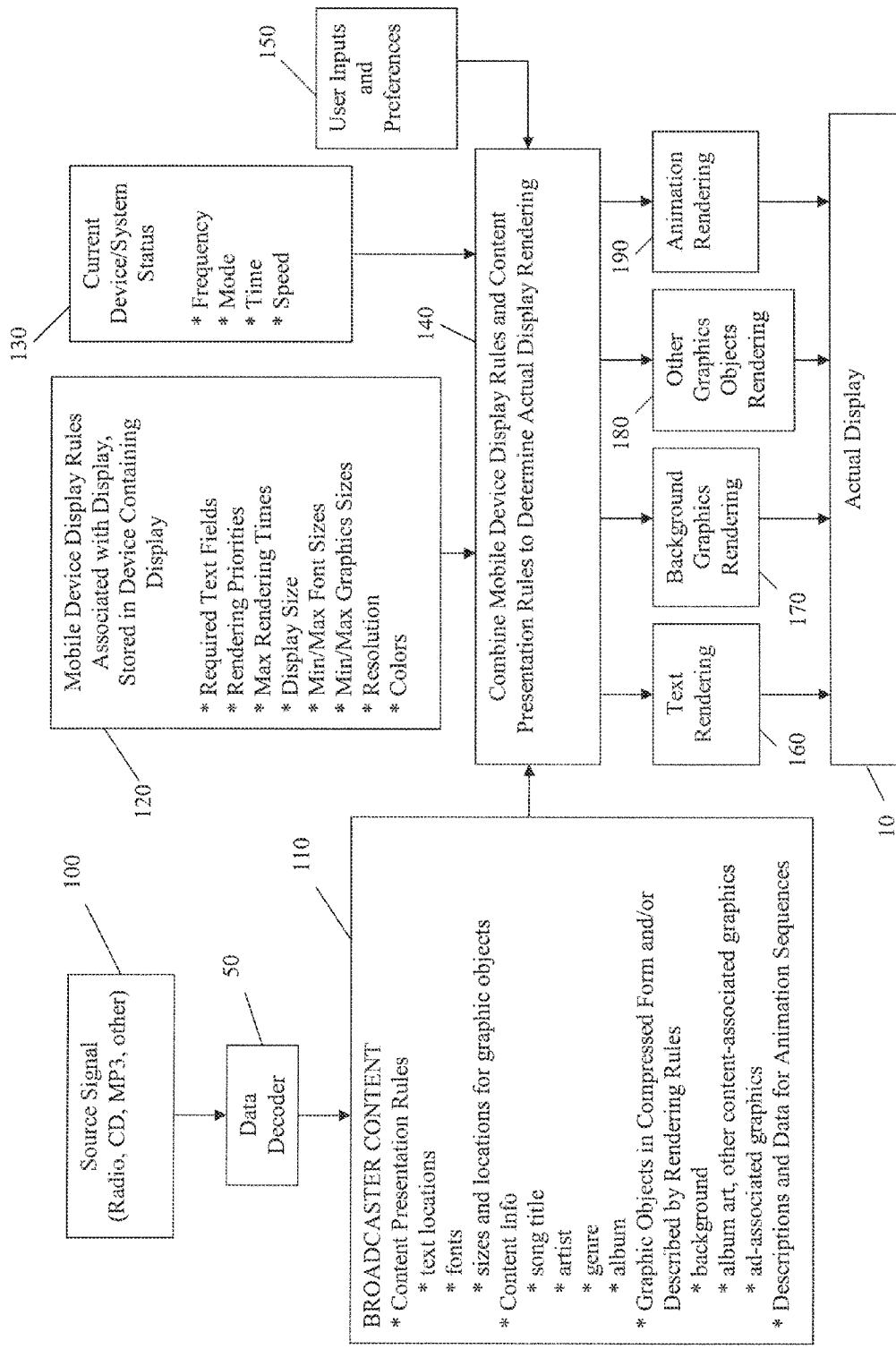
FIG. 4 is a schematic diagram of various inputs and outputs for the present invention.

As illustrated in FIG. 4, the mobile device will receive a source signal 100. This source signal can be AM or FM Radio, Satellite Radio, CD, MP3 or any other type of signal. The signal is then processed through a data decoder 50. As is well known in the art, the content is provided through the speakers. The present invention is directed to the display of the current content as well as any specialized content on the display 10 of the mobile device.

The broadcaster or source signal 100 may provide content presentation rules 110. The display may have certain limitations, output rules or display rules 120 provided by the mobile device manufacturer, or if it is a vehicle radio the vehicle manufacturer. If the mobile device is in a vehicle, other optional device, system, and vehicle status inputs 130 may also be provided. A display controller 140 capable of combing content presentation rules 110, display rules 120, status inputs 130, and if desired user preferences 150 to provide one cohesive visual output on the display 10 is included. Part of the controller's duties are to provide text rendering 160, background graphics rendering 170, other graphics rendering 180 and animation rendering 190.

As previously discussed, the source signal 100 may be any desirable audio or video signal. However, in the preferred embodiment, the mobile device is a device capable of receiving radio waves from traditional broadcasters, such as AM, FM radio waves or satellite radio waves and providing an audio output to the user. The source signal 100 in addition to providing audio output will provide content presentation rules or broadcaster content 110, which may include specialized content or affinity marketing content. A broadcaster may also provide content that may be used with other source signals, such as an FM radio station providing their listeners with a skin to listen not only to their FM broadcast and provide selected advertisements but also allow use with other source signals. More specifically, the broadcaster may allow use of their specialized content, or provide particular specialized content to the user, such that when the user selects other source signals, the broadcaster's content is still used, if the user desires to use the content and the broadcaster allows such use. For example, a broadcaster provides a skin for listening to the radio, but the skin may convert, as illustrated in FIG. 3 to a broadcaster provided skin for listening to other source signals, such as CDs and MP3's.

The data decoder 50 may be any decoder capable of decoding not only the source signal, but also any visual content provided, or any customizable content provided. The data decoder may also be capable of decoding content presentation rules, which may be part of the customizable content.

The broadcaster or source signal 100 may provide content presentation rules 110. The content presentation rules may include text locations, fonts, sizes and locations for graphic objects. As part of the content presentation rules, the broadcaster may also provide specified content such as song title, artist, genre, album, and other textual and visual content related to the audio content being provided. Textual advertisements may also be provided by the broadcaster, to be used in one of the exemplary customized content boxes 200. The textual information may further include station IDs or names 300. If graphic objects are provided by the broadcaster, the objects are typically in a compressed form and/or are described by rendering rules, which minimize the amount of content transferred to the mobile device. The graphical data may also be used to modify the textual information provided, such as how the station identification of the broadcaster 300, illustrated in FIG. 1 is displayed in a visual format, other than simple text. Graphical information downloaded to the device may be a background, a customized skin, album art, other content-associated graphics, and any ad-associated graphics such as graphics for content boxes 200. If any animations are included, such as scrolling or flashing text, these rules for animation sequences and the descriptions or data for animation sequences may also be provided by the broadcaster.

The mobile device may also include a memory module for storing of broadcaster content. In some instances, the broadcaster may also provide samples of music or a free song that may be later saved as an MP3 by the mobile device. For example, while the user is listening to one channel of an HD radio, the other channel may download an MP3 file having a song or other content for later use by the user. The memory module may also be used to store skins and specialized broadcaster content, so that once the broadcaster content is downloaded or affinity marketing content is downloaded to the device, the device does not have to re-download the content every time the user changes the station. Therefore, the device may ignore certain data streams from the broadcaster such as an already downloaded skin, and only update advertisement and song/album/artist information in the customized boxes 300, while the other content remains the same.

As the present invention may receive data and text without interacting upstream with the signal source, and not through high speed internet downloads, the content provided by the broadcaster is typically simple and is expected to make use of known mobile device display rules 120. More specifically, the device manufacturer, or vehicle manufacturer, or mobile phone service may provide specific display rules 120 and in some embodiments multiple display rules which may be selected by the broadcaster. By having the broadcaster use many of the display rules 120 provided for by the device manufacturer, the broadcaster or signal source 100 does not have to provide as much information wirelessly through traditional broadcast mechanisms to the mobile device. While only one set of display rules may be provided, it is expected that the display device manufacturers will provide multiple optional display rules that allow each broadcaster to select a set of display rules and then use those display rules to present their specialized content.

Examples of mobile device display rules 120 include required text field(s), rendering priorities, max rendering times, display size, minimum and maximum font sizes, minimum and maximum graphic sizes, resolution of the display, colors able to be displayed and any other desirable display rules. In some instances, the display rules may also include locations required for soft buttons, such as the illustrated touch screen buttons 310 in FIGS. 2 and 3.

In some vehicles, the vehicle manufacturer has traditionally displayed various vehicle data on the display screen. As part of the current device and system status 130, the display may also provide for vehicle status data and other data that may be interesting to the user. For example, the mobile device may display the current device and system status, such as the frequency of the radio band, the current mode or signal source, such as FM Radio, AM Radio, Satellite Radio, CD, MP3 or other. The current device or system status may be configured to provide vehicle information relating to temperature of the vehicle, climate system controls, vehicle status and other data.

The user may also provide user preferences 150. The user preferences 150 may include brightness of the screen, elimination of broadcaster skins, the use of a single skin, elimination of advertising from the display or any other desirable preference related to the display 10.

The display controller 140 then combines all inputs regarding the display to provide an output to the display 10. The controller 140 may be configured to give certain preferences or priorities to various inputs. For example, the display is expected to give priority to necessary display rules 120, then to user inputs 150 with broadcaster content and content presentation rules 110 being last. The display controller then outputs a video signal to the display 10, which would include text rendering 160, background graphics rendering 170, other graphics rendering 180 and animation rendering 190.

In operation, the mobile device will be manufactured having certain embedded display rules 120. These display rules 120 may include various selectable options and generally govern the system functions and capabilities. Upon the user selecting a signal source 100, such as an FM broadcast, the broadcaster would be streaming constantly or in intervals specialized content 110 to mobile devices capable of receiving such content. The mobile device would then use a data decoder 50 to determine what content was provided, for example, the broadcaster would provide various affinity or customized content, which could include display of promotions, advertisements or other information in various test boxes 200. For example, the user may have set a preference to look for any traffic data regarding a particular highway, and the broadcaster may provide textual output regarding traffic status of a particular highway, which the device then grabs and displays. If desired, the broadcaster can provide as part of the content presentation rules certain graphic objects that may be customized skins, or graphical advertisements. The graphical advertisement data may also include various animations.

The controller 140 then takes the content and renders it to a display 10 by taking into account various display rules, 120, user preferences 150 and broadcaster content 110. By using the controller 140 to merge display constraints, such as the illustrated display rules 120, with the desired broadcaster content 110 into an acceptable video output for the particular system, the broadcaster is freed from addressing the constraints of various systems, and more particularly broadcasting to the display constraints of a particular radio. Of course, a broadcaster may send out multiple content rules, such as content rules for each of three different systems from which the mobile device may choose the best corresponding content rules, based upon its display capabilities.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A system for receiving a source signal including audio content and graphical broadcaster content and content presentation rules from a broadcaster, said system comprising:

a display screen;

a mobile device that is manufactured with embedded display rules and configured to receive said source signal and having said display screen; and a display controller providing a video output to said display screen and wherein said mobile device is capable of receiving radio broadcasts, wherein said mobile device receives said audio content and said display controller receives said graphical broadcaster content and said content presentation rules from said source signal without interaction from said mobile device to the broadcaster and wherein said display controller outputs said graphical broadcaster content to said display screen by combining said content presentation rules and said embedded display rules;

wherein said graphical broadcaster content includes advertisements, album art, and affinity marketing graphics;

wherein said content presentation rules includes at least one of text locations, fonts, sizes and locations for graphical objects and as part of said content presentation rules, the broadcaster also provides specified content that includes at least one of song title, artist, genre, album, textual content related to the audio content being provided, and visual content related to the audio content being provided;

wherein said display controller gives preference to said mobile device that is manufactured with said embedded display rules over said content presentation rules; and wherein said source signal include downloadable MP3 files.

2. The system of claim 1 wherein said mobile device also receives user inputs and preferences and wherein said display controller gives preference to said user inputs and preferences over said content presentation rules.

3. The system of claim 1 wherein said display controller outputs said graphical objects to at least one customizable box on said display screen.

* * * * *